United States Patent
Griffin et al.

(10) Patent No.: US 12,367,071 B2
(45) Date of Patent: Jul. 22, 2025

(54) QUANTUM COMPUTING SYSTEM HEAT ORCHESTRATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 696 days.

(21) Appl. No.: 17/583,711

(22) Filed: Jan. 25, 2022

(65) Prior Publication Data

US 2023/0236884 A1    Jul. 27, 2023

(51) Int. Cl.
  *G06F 9/48*    (2006.01)
  *G06N 10/80*   (2022.01)

(52) U.S. Cl.
  CPC .......... *G06F 9/4893* (2013.01); *G06N 10/80* (2022.01)

(58) Field of Classification Search
  None
  See application file for complete search history.

(56) References Cited

U.S. PATENT DOCUMENTS

| | | | |
|---|---|---|---|
| 11,494,681 B1* | 11/2022 | Peterson | G06N 10/80 |
| 2006/0095911 A1* | 5/2006 | Uemura | G06F 9/5027 |
| | | | 718/100 |
| 2010/0205578 A1* | 8/2010 | Barness | G06F 8/4432 |
| | | | 717/100 |
| 2019/0042966 A1 | 2/2019 | Hogaboam et al. | |
| 2020/0174836 A1* | 6/2020 | Gunnels | G06F 9/5044 |
| 2020/0201655 A1 | 6/2020 | Griffin et al. | |
| 2021/0003456 A1 | 1/2021 | Olivadese et al. | |
| 2021/0243247 A1 | 8/2021 | He et al. | |
| 2021/0263773 A1* | 8/2021 | Shah | G06F 9/4893 |
| 2021/0350270 A1* | 11/2021 | Jones | G06F 1/20 |
| 2022/0221830 A1* | 7/2022 | Noh | G05B 15/02 |
| 2022/0398099 A1* | 12/2022 | Willenborg | G06N 10/00 |

FOREIGN PATENT DOCUMENTS

| | | | | |
|---|---|---|---|---|
| WO | WO-2021059013 A1 * | 4/2021 | | G06N 10/00 |
| WO | 2021085297 A1 | 5/2021 | | |

OTHER PUBLICATIONS

L. Liu and X. Dou, "QuCloud: A New Qubit Mapping Mechanism for Multi-programming Quantum Computing in Cloud Environment," 2021 IEEE International Symposium on High-Performance Computer Architecture (HPCA), Seoul, Korea (South), 2021, pp. 167-178. (Year: 2021).*

* cited by examiner

*Primary Examiner* — Frank D Mills
(74) *Attorney, Agent, or Firm* — Dority & Manning, P.A.

(57) ABSTRACT

A quantum process is caused to be initiated on a quantum computing system from a quantum instruction file. A corresponding plurality of temperature values of the quantum computing system associated with an execution of the quantum process is determined at a plurality of different times. Based on the plurality of temperature values of the quantum computing system, a temperature profile that corresponds to the quantum instruction file is generated. The temperature profile is stored.

20 Claims, 10 Drawing Sheets

QUANTUM COMPUTING SYSTEM HEAT ORCHESTRATION

BACKGROUND

Quantum computing systems operate at very low temperatures and are very sensitive to temperature differences.

SUMMARY

The examples disclosed herein implement quantum computing system heat orchestration. The examples analyze the temperature impact of a quantum process on a quantum computing system and generate a temperature profile based on the analysis. The temperature profiles of quantum processes may subsequently be used to make scheduling decisions to reduce the occurrence and/or duration of cool-down periods of a quantum computing system.

In one example a method is provided. The method includes causing, by a computing device, a first quantum process to be initiated on a first quantum computing system from a first quantum instruction file. The method further includes determining, by the computing device, at a plurality of different times, a corresponding plurality of temperature values of the first quantum computing system associated with an execution of the first quantum process on the first quantum computing system. The method further includes, based on the plurality of temperature values of the first quantum computing system, generating a first temperature profile that corresponds to the first quantum instruction file. The method further includes storing the first temperature profile.

In another example a computing device is provided. The computing device includes a memory, and a processor device coupled to the memory to cause a quantum process to be initiated on a quantum computing system. The processor device is further to determine, at a plurality of different times, a corresponding plurality of temperature values of the quantum computing system while the quantum process is executing on the quantum computing system. The processor device is further to, based on the plurality of temperature values of the quantum computing system, generate a temperature profile that corresponds to a quantum instruction file from which the quantum process is initiated. The processor device is further to store the temperature profile.

In another example a non-transitory computer-readable storage medium is provided. The non-transitory computer-readable storage medium includes executable instructions to cause a processor device to cause a quantum process to be initiated on a quantum computing system from a quantum instruction file. The instructions further cause the processor device to determine a corresponding plurality of temperature values of the quantum computing system while the quantum process is executing on the quantum computing system. The instructions further cause the processor device to, based on the plurality of temperature values, generate a temperature profile that corresponds to the quantum instruction file. The instructions further cause the processor device to store the temperature profile.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
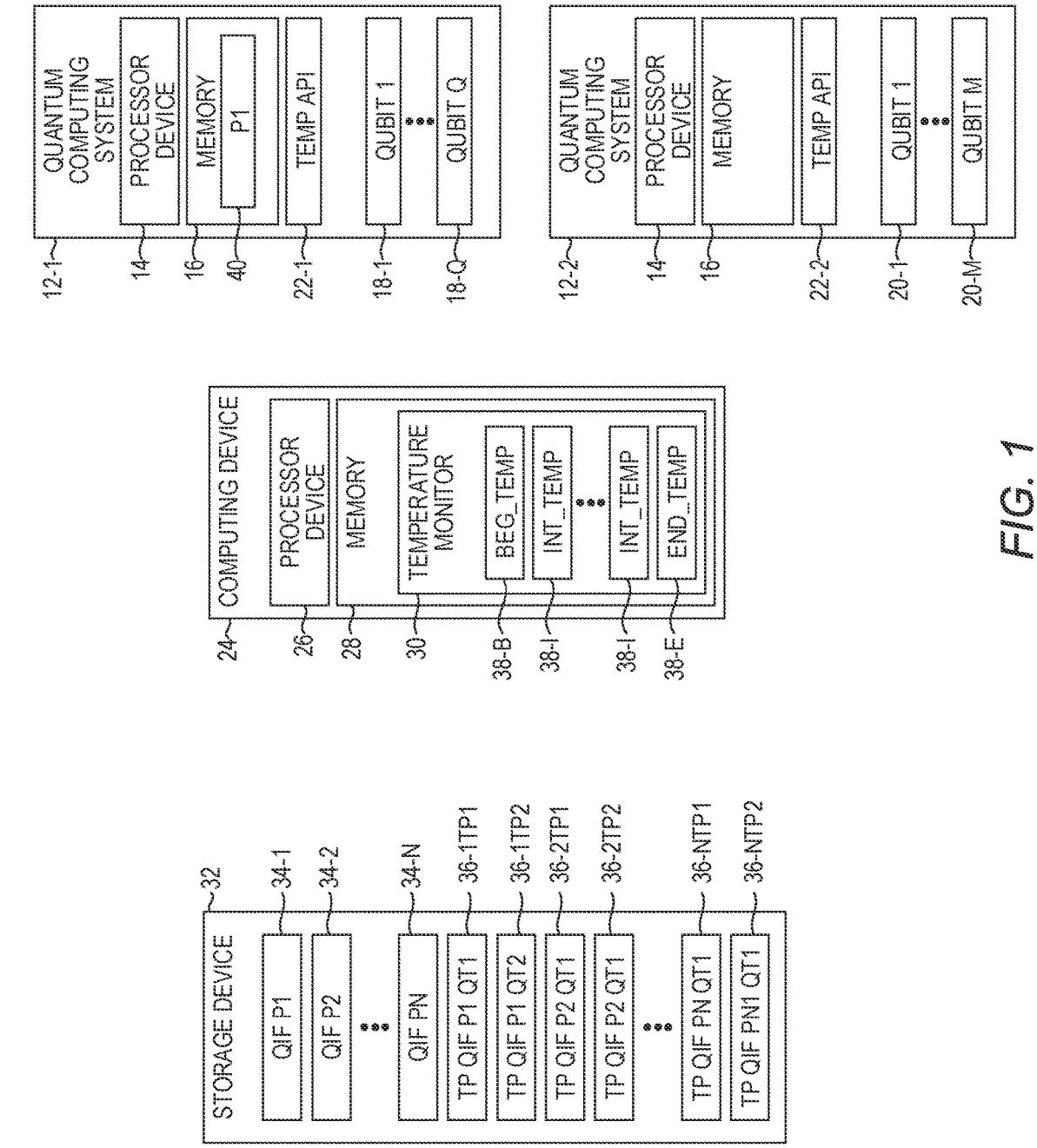
FIG. 1 is a block diagram of an environment in which quantum computing system heat orchestration may be practiced according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing systems operate at very low temperatures and are very sensitive to temperature differences. Quantum processes executing on a quantum computing system directly impact the temperature of the quantum computing system via interaction with qubits. As a quantum computing system heats up, errors increase and cool down periods may be needed, reducing the overall throughput of the quantum computing system. There is currently little or no insight into how a quantum process may impact the temperature of a quantum computing system, which results in an inability to make the most efficient use of a quantum computing system from a temperature standpoint. Not understanding the temperature impacts of quantum processes may result in a poor mix of quantum processes executing concurrently on a quantum computing system that results in an unnecessary cool down period.

Moreover, software developers who generate the quantum programming instructions that define the functionality of a quantum process may have little or no insight into the potential temperature impact of certain quantum programming instructions, or whether choosing one set of quantum programming instructions over another set that accomplishes the same thing may be preferable, or whether rearranging quantum programming instructions in a quantum instruction file may aid in temperature management.

The examples disclosed herein implement quantum computing system heat orchestration. The examples analyze the temperature impact of a quantum process on a quantum computing system and generate a temperature profile based on the analysis. The temperature profiles of quantum processes may subsequently be used to make scheduling decisions to reduce cool-down periods of a quantum computing system that may otherwise be needed.

In some examples disclosed herein, quantum instruction files may be analyzed, and the impact of programming instruction segments, such as individual quantum programming instructions or groups of quantum programming instructions, may be determined. The quantum instruction file may be annotated with temperature information to advise a software developer of the impact of various quantum programming instructions. In some examples, information gleaned based on the analysis of programming instruction segments may be used by an integrated development environment (IDE) to provide real-time feedback to a software developer while the software developer is generating a quantum instruction file.

FIG. 1 is a block diagram of an environment 10 in which quantum computing system heat orchestration may be practiced according to some implementations. The environment 10 includes two quantum computing systems 12-1-12-2 (generally, quantum computing systems 12), each of which operates in a quantum environment but can operate using classical computing principles or quantum computing principles. When using quantum computing principles, the quantum computing systems 12 perform computations that utilize quantum-mechanical phenomena, such as superposition and entanglement. The quantum computing systems 12 may operate under certain environmental conditions, such as at or near 0° Kelvin. When using classical computing principles, the quantum computing systems 12 utilize binary digits that have a value of either 1 or 0. The quantum computing systems 12 each have one or more processor devices 14 and a memory 16. In this example, the quantum computing system 12-1 implements a plurality of qubits 18-1-18-Q of a particular qubit type, such as a photonic qubit type. The quantum computing system 12-2 implements a plurality of qubits 20-1-20-M of a different qubit type, such as a silicon qubit type. The quantum computing systems 12 include temperature application programming interfaces (APIs) 22-1-22-2 that can be invoked to determine real-time temperatures of the quantum computing systems 12-1-12-2.

In this example the environment 10 also includes a classical computing device 24, which includes one or more processor devices 26 and a memory 28. The computing device 24 is executing a temperature monitor 30, which, as will be discussed in greater detail herein, operates to generate temperature profiles that correspond to quantum instruction files.

Because the temperature monitor 30 is a component of the computing device 24, functionality implemented by the temperature monitor 30 may be attributed to the computing device 24 generally. Moreover, in examples where the temperature monitor 30 comprises software instructions that program the processor device 26 to carry out functionality discussed herein, functionality implemented by the temperature monitor 30 may be attributed herein to the processor device 14. Further, while the temperature monitor 30 is illustrated as running on the classical computing device 24, in other implementations the temperature monitor 30 may execute on a quantum computing system, such as one of the quantum computing systems 12.

A storage device 32 contains a plurality of quantum instruction files (QIF) 34-1-34-N (generally, quantum instruction files 34). The quantum instruction files 34 may comprise any suitable file capable of storing quantum programming instructions. The term quantum programming instructions refers to program instructions in a programming language that includes program instructions capable of interacting with qubits. In one implementation, the quantum instruction files 34 comprise quantum assembly language (QASM) files. Each of the quantum instruction files 34 implement a quantum process when executed by a quantum computing system 12.

The generation of temperature profiles 36-1TP1 and 36-1TP2, each of which correspond to the quantum instruction file 34-1, will now be discussed. The quantum computing systems 12 may be executing no user processes, quantum or classical, to eliminate the potential effect on temperature such processes may have on the quantum computing systems 12. Prior to initiating a quantum process on the quantum computing system 12-1, the temperature monitor 30 may periodically invoke the temperature API 22-1 to ensure that the quantum computing system 12-1 is at a sufficiently low and/or stable temperature. The temperature monitor 30 may require that the temperature of the quantum computing system 12-1 remain within a relatively small variation for a determined period of time prior to initiating a quantum process. Once the temperature monitor 30 determines that the quantum computing system 12-1 is ready to be utilized for temperature profile generation, the temperature monitor 30 may take a beginning temperature 38-B of the quantum computing system 12-1. The temperature monitor 30 may then cause a quantum process 40 to be initiated from the quantum instruction file 34-1 on the quantum computing system 12-1. The initiation may differ depending on the particular implementation, but in one implementation, the temperature monitor 30 may provide a uniform resource identifier (URI) that identifies the location of the quantum instruction file 34-1 to the quantum computing system 12-1. The quantum computing system 12-1 initiates the quantum process 40 from the quantum instruction file 34-1. The temperature monitor 30 may periodically invoke the temperature API 22-1 to obtain a plurality of intermediate temperatures 38-I. The temperature monitor 30 may allow the quantum process 40 to execute for a desired period of time and may obtain tens or hundreds of intermediate temperatures 38-I. After a designated period of time or in accordance with the natural processing sequence of the quantum process 40, the quantum process 40 terminates. The temperature monitor 30 may then invoke the temperature API 22-1 to obtain an ending temperature 38-E. In some implementations, the temperature monitor 30 may wait some determined period of time subsequent to the termination of the quantum process 40, such as 10 seconds, 30 seconds, or the like, to obtain the ending temperature 38-E.

Based on the beginning temperature 38-B, the plurality of intermediate temperatures 38-I, and the ending temperature 38-E, the temperature monitor 30 generates a temperature profile 36-1TP1 that corresponds to the quantum instruction file 34-1. The temperature profile 36-1TP1 may comprise any suitable data that may be used to quantify an expected rise in temperature of a quantum computing system having similar characteristics to the quantum computing system 12-1 during the execution of a quantum process initiated from the quantum instruction file 34-1. The temperature profile 36-1TP1 may comprise, for example, actual temperatures over time, a rate of temperature increase over time, an absolute temperature increase, or any other suitable data useful to determine how the corresponding quantum process may impact the temperature of a quantum computing system. In some implementations, the temperature profile 36-1TP1 may include other characteristics of the quantum computing system 12-1 at the times that the temperatures are obtained, such as the CPU utilization, qubit utilization, or the like.

The temperature profile 36-1TP1 may also include information regarding characteristics of the quantum computing system 12-1 used to generate the temperature profile 36-1TP1, such as the qubit type of the qubits 18, a processor device type of the processor device 14 of the quantum computing system 12-1, an amount of memory of the quantum computing system 12-1, or the like. In some implementations, the temperature monitor 30 may repeat this process multiple times for the quantum instruction file 34-1 and generate a final temperature profile 36-1TP1 that is based on a plurality of different temperature profiles.

Because different types of qubits implemented by different quantum computing system s12 may have relatively substantial differences in the temperature increase caused by a quantum process, the temperature monitor 30 may generate a temperature profile 36-1TP2 using the quantum computing system 12-2 in substantially the same manner as that described above regarding the generation of the temperature profile 36-1TP1. Thus, the temperature profile 36-1TP1 may be useful in understanding the likely temperature impact of a quantum process initiation from the quantum instruction file 34-1 on a quantum computing system utilizing photonic qubits, and the temperature profile 36-1TP2 may be useful in understanding the likely temperature impact of a quantum process initiation from the quantum instruction file 34-1 on a quantum computing system utilizing silicon qubits. The temperature monitor 30 repeats this process on the quantum computing system 12-2 for the quantum instruction files 34-2-34-P, to generate corresponding temperature profiles 36-2TP1-36-NTP2.

Figure 2:
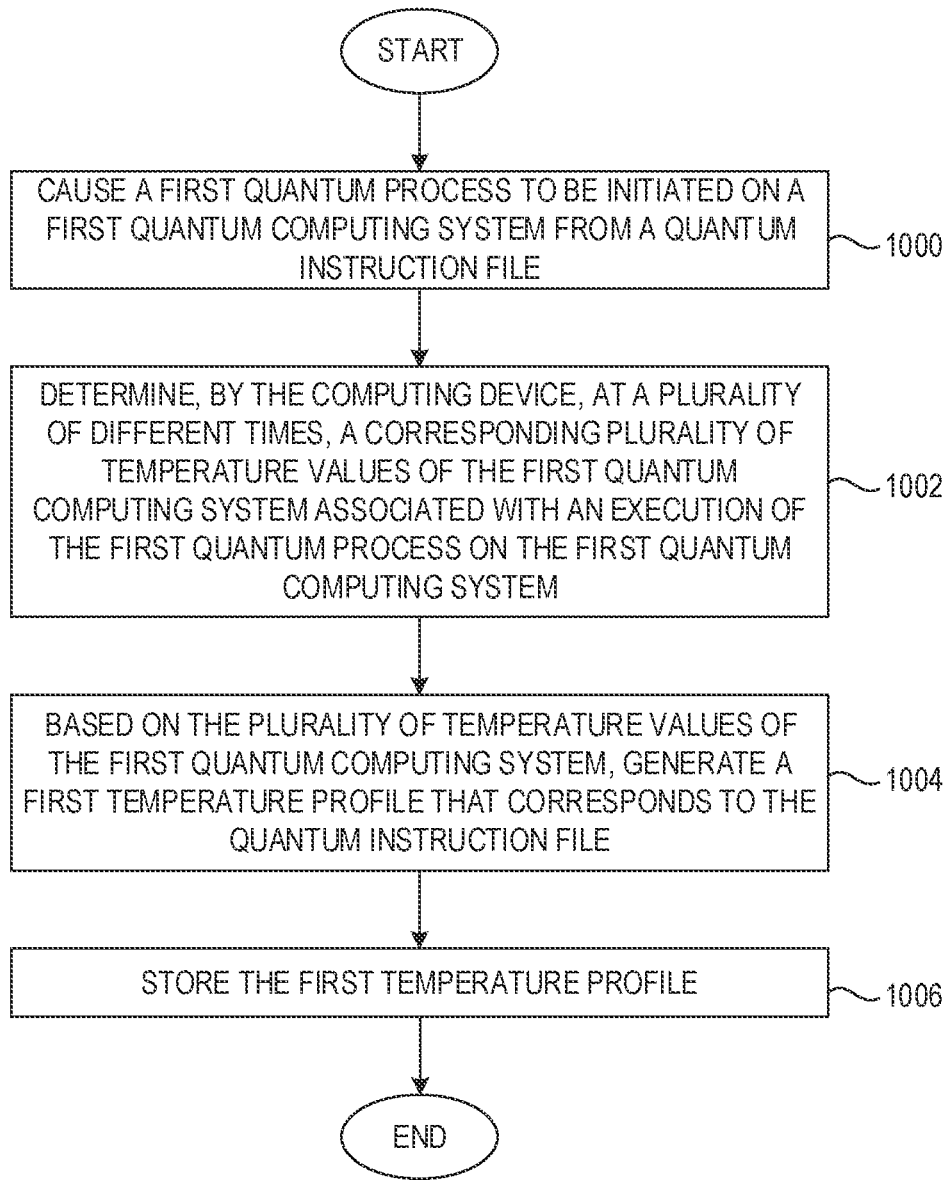
FIG. 2 is a flowchart of a method for generating a temperature profile according to one implementation.

FIG. 2 is a flowchart of a method for generating a temperature profile according to one implementation. FIG. 2 will be discussed in conjunction with FIG. 1. The computing device 24 causes the quantum process 40 to be initiated on the quantum computing system 12-1 from the quantum instruction file 34-1 (FIG. 2, block 1000). The computing device 24 determines, at a plurality of different times, a corresponding plurality of temperature values of the quantum computing system 12-1 associated with the execution of the quantum process 40 on the quantum computing system 12-1 (FIG. 2, block 1002). The computing device 24, based on the plurality of temperature values of the quantum computing system 12-1, generates the temperature profile 36-1TP1 that corresponds to the quantum instruction file 34-1 (FIG. 2, block 1004). The computing device 24 stores the temperature profile 36-1TP1 (FIG. 2, block 1006).

Figure 3:
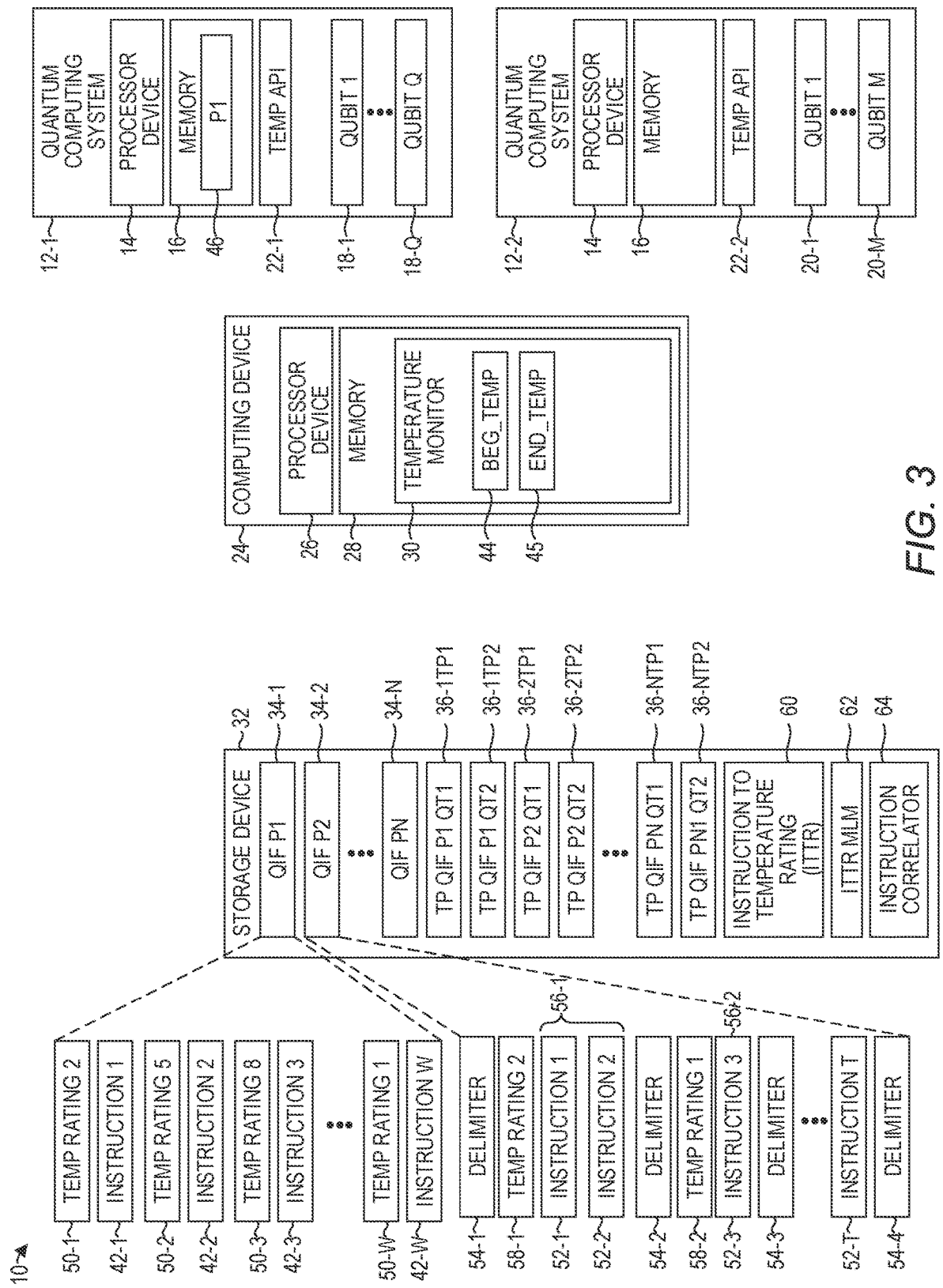
FIG. 3 is a block diagram of the environment illustrated in FIG. 1 according to another implementation.

FIG. 3 is a block diagram of the environment illustrated in FIG. 1 according to another implementation. In this example, the temperature monitor 30 determines temperature information associated with programming instruction segments of a quantum instruction file. A programming instruction segment may comprise, for example, individual programming instructions, and/or a set of programming instructions that are delineated in the quantum instruction file 34. The temperature monitor 30 may do this concurrently with generating the temperature profiles 36, or independently of generating the temperature profiles 36. When done independently, the temperature monitor 30 may begin the process as discussed above with regard to FIG. 1, waiting until a quantum computing system 12-1 is at a steady, relatively unvarying temperature prior to initiating the process.

In this embodiment, the programming instruction segments are individual quantum programming instructions. The temperature monitor 30 invokes the temperature API 22-1 of the quantum computing system 12-1 to determine a beginning temperature 44 of the quantum computing system 12-1. The temperature monitor 30 accesses the quantum instruction file 34-1 and causes a first quantum programming instruction 42-1 of the quantum instruction file 34-1 to be executed in a quantum process 46 on the quantum computing system 12-1. Subsequent to the execution of the first quantum programming instruction 42-1, the temperature monitor 30 invokes the temperature API 22-1 of the quantum computing system 12-1 to determine an ending temperature 45 of the quantum computing system 12-1. The temperature monitor 30 then generates an annotation 50-1 comprising temperature information in the quantum instruction file 34-1. The temperature information may comprise any suitable information that quantifies the temperature effect of the execution of the quantum programming instruction 42-1 on the quantum computing system 12-1. By way of non-limiting example, the annotation 50-1 may comprise a relative rating or a value that identifies an actual temperature increase.

The temperature monitor 30 then steps through the quantum instruction file 34-1 repeating this process for each of the remaining quantum programming instructions 42-2-42-W, generating annotations 50-2-50-W, each of which comprises temperature information that quantifies the temperature effect of the corresponding quantum programming instruction 42. The ending temperature of the previous quantum programming instruction 42 may serve as the beginning temperature of the next quantum programming instruction 42.

The software developer that generated the quantum instruction file 34-1 may review the annotations 50 to obtain an understanding of the temperature impacts of the quantum programming instructions 42. The software developer may be able to reorder certain programming instructions to alter the overall temperature impact, by, for example and to the extent possible, ensuring that quantum programming instructions 42 that have a greater temperature impact are executed earlier in the sequence of quantum programming instructions 42 than those with a lesser temperature impact, such that the quantum computing system 12-1 may have an opportunity to cool even before the end of the execution of a quantum process initiated from the quantum instruction file 34-1.

The software developer may also, over time, learn that different programming instructions that have similar or identical results may have different temperature impacts, and may thereby learn to replace those programming instructions that have a higher temperature impact with those with a lower temperature impact.

As another example, the quantum instruction file 34-2 comprises a plurality of quantum programming instructions 52-1-52-T. In this example, programming instruction segments comprise one or more quantum programming instructions 52 that are delineated by delimiters 54-1, 54-2, 54-3, and 54-4. In particular, a programming instruction segment 56-1 is delineated by delimiters 54-1 and 54-2, and a programming instruction segment 56-2 is delineated by delimiters 54-2 and 54-3. The programming instruction segments 56 may comprise multiple quantum programming instructions 52 or individual quantum programming instructions 52. The developer may insert the delimiters 54 in the quantum instruction file 34-2 using predetermined markers or characters for the purpose of learning the temperature impact of sets of quantum programming instructions 52 or individual quantum programming instructions 52. The temperature monitor 30 accesses the quantum instruction file 34-2 and submits the programming instruction segments 56 to the quantum computing system 12-1 as discussed above with regard to the individual quantum programming instructions 42 of the quantum instruction file 34-1. The temperature monitor 30 obtains a beginning temperature value prior to the beginning of a programming instruction segment 56, and an ending temperature after the last programming instruction in a programming instruction segment 56. The temperature monitor 30 generates annotations 58-1 and 58-2 that quantify the temperature impacts of the programming instruction segments 56-1 and 56-2. While for purposes of illustration only two programming instruction segments 56-1 and 56-2 are shown, the quantum instruction file 34-2 may have tens, hundreds, or thousands of programming instruction segments 56.

The temperature monitor 30, over time, may annotate tens, hundreds, or thousands of quantum instruction files 34. In one implementation, the temperature monitor 30 may analyze a large number of annotated quantum instruction files 34 and generate an instruction to temperature rating (ITTR) data structure 60 that correlates quantum programming instructions to temperature information quantifying an impact of such quantum programming instructions. In some embodiments, an ITTR machine-learned model (MLM) 62 may be trained to, upon input of a quantum programming instruction, output temperature information associated with the quantum programming instruction. The temperature monitor 30, in conjunction with the ITTR data structure 60 or the ITTR MLM 62 and input from a developer, may also generate an instruction correlator data structure 64 that correlates programming instruction segments, both individual programming instructions and sets of programming instructions, from programming instruction segments that have a relatively greater temperature impact to equivalent programming instruction segments that have a lower temperature impact.

Figure 4:
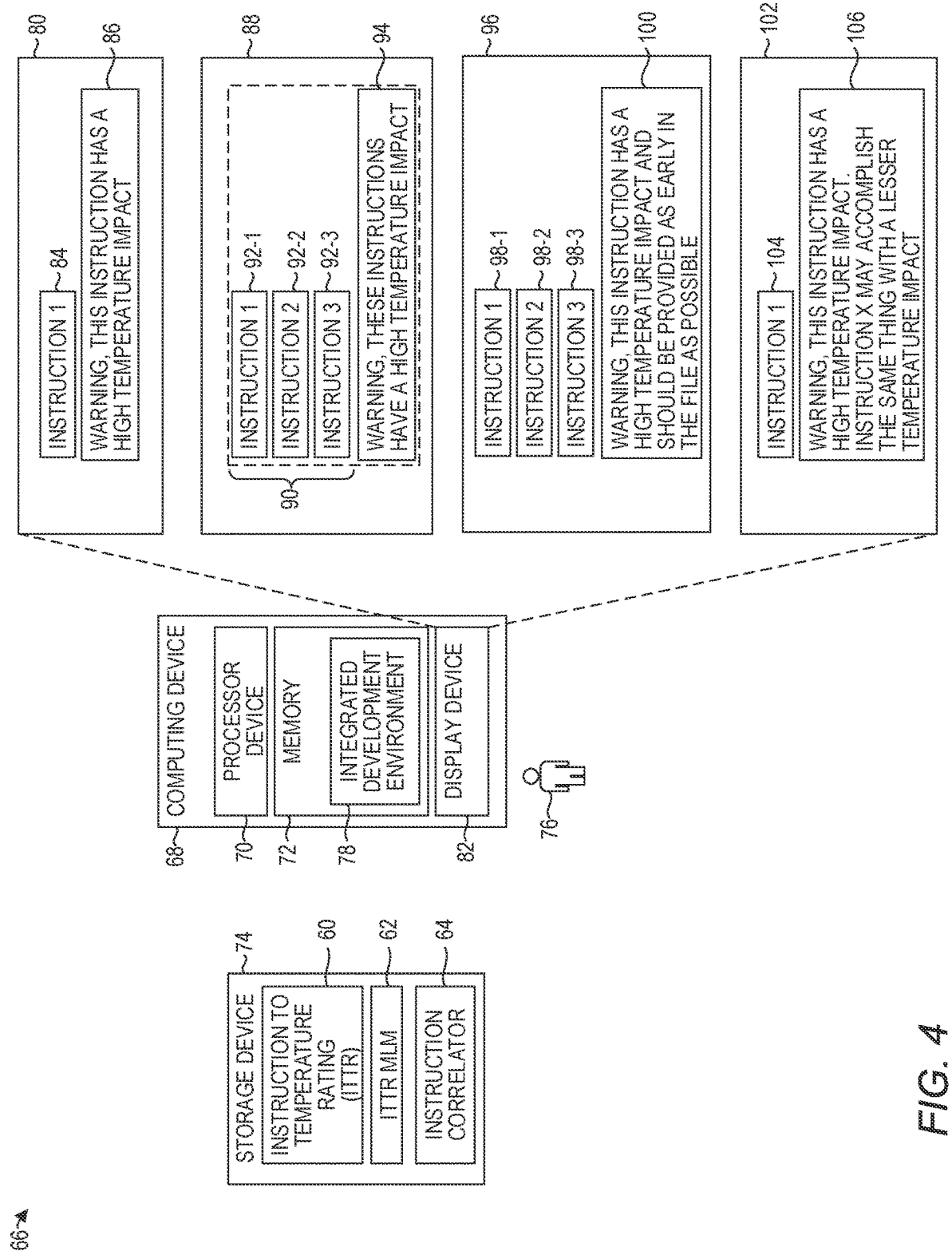
FIG. 4 is a block diagram of an environment according to another implementation.

FIG. 4 is a block diagram of an environment 66 according to another implementation. In this implementation, the environment 66 is a software development environment and includes a computing device 68 that includes a processor device 70 and a memory 72. The computing device 68 is communicatively coupled to a storage device 74. The ITTR data structure 60 and/or the ITTR MLM 62 are stored on the storage device 74. The instruction correlator data structure 64 may also be stored on the storage device 74.

A user 76 interacts with an integrated development environment (IDE) 78 to generate a quantum instruction file. In particular, the user 76 enters quantum programming instructions via an input device, such as a keyboard, and the IDE 78 may, in real time, examine the quantum programming instructions and provide immediate feedback regarding syntax, formatting, and the like. When the user 76 is satisfied with the quantum programming instructions, the user 76 may control the IDE 78 to save the quantum programming instructions in a file for subsequent execution on a quantum computing system 12.

In this example, the IDE 78 utilizes the ITTR data structure 60 and/or the ITTR MLM 62 to provide feedback to the user 76 of the temperature impacts of certain quantum programming instructions. As an example, assume that the IDE 78 presents a user interface 80 on a display device 82. The user interface 80 may initially be blank. The user 76 enters, via a keyboard, a quantum programming instruction 84, which the IDE 78 presents in the user interface 80 in real time, as the user 76 enters the characters that compose the quantum programming instruction 84. The IDE 78 accesses the ITTR data structure 60 and determines that the quantum programming instruction 84 is identified in the ITTR data structure 60 as a quantum programming instruction that has a temperature impact above a determined threshold. The IDE 78 presents a message 86 on the display device 82 based on temperature information in the ITTR data structure 60 that corresponds to the quantum programming instruction 84. In this example, the message 86 is a warning that the quantum programming instruction 84 is a quantum programming instruction that may have a high temperature impact.

As an alternative example, assume that the IDE 78 presents a user interface 88 on the display device 82. The user 76 enters, via a keyboard, a programming instruction segment 90 that comprises three quantum programming instructions 92-1-92-3. The IDE 78 accesses the ITTR data structure 60 and determines that the programming instruction segment 90 is identified in the ITTR data structure 60 as a programming instruction segment that has a temperature impact above a determined threshold. The IDE 78 presents a message 94 on the display device 82 based on temperature information in the ITTR data structure 60 that corresponds to the programming instruction segment 90. In this example, the message 94 is a warning that the programming instruction segment 90 is a programming instruction segment that may have a high temperature impact.

As an alternative example, assume that the IDE 78 presents a user interface 96 on the display device 82. The user 76 enters, via a keyboard, three quantum programming instructions 98-1, 98-2 and 98-3. After each of the quantum programming instructions 98-1 and 98-2 are entered, the IDE 78 accesses the ITTR data structure 60 and determines that the quantum programming instructions 98-1 and 98-2 do not have a temperature impact above a determined threshold. After the quantum programming instruction 98-3 is entered, the IDE 78 accesses the ITTR data structure 60 and determines, based on the temperature information in the ITTR data structure 60 that corresponds to the quantum programming instruction 98-3, that the quantum programming instruction 98-3 has a temperature impact above a determined threshold, and presents a message 100 on the display device 82 based on temperature information in the ITTR data structure 60 that corresponds to the programming instruction segment 90. In this example, the message 100 is a warning that the quantum programming instruction 98-3 is a programming instruction segment that may have a high temperature impact, and that it should be provided as early in the series of quantum programming instructions as possible.

As another alternative example, assume that the IDE 78 presents a user interface 102 on the display device 82. The user 76 enters, via a keyboard, a quantum programming instruction 104. The IDE 78 accesses the ITTR data structure 60 and determines that the quantum programming instruction 104 is identified in the ITTR data structure 60 as a quantum programming instruction that has a temperature impact above a determined threshold. The IDE 78 accesses the instruction correlator data structure 64 and determines that an equivalent quantum programming instruction has a lower temperature impact. The IDE 78 presents a message 106 on the display device 82 that warns that the quantum programming instruction 104 is a quantum programming instruction that may have a high temperature impact and presents the equivalent quantum programming instruction that may have a lower temperature impact.

Figure 5:
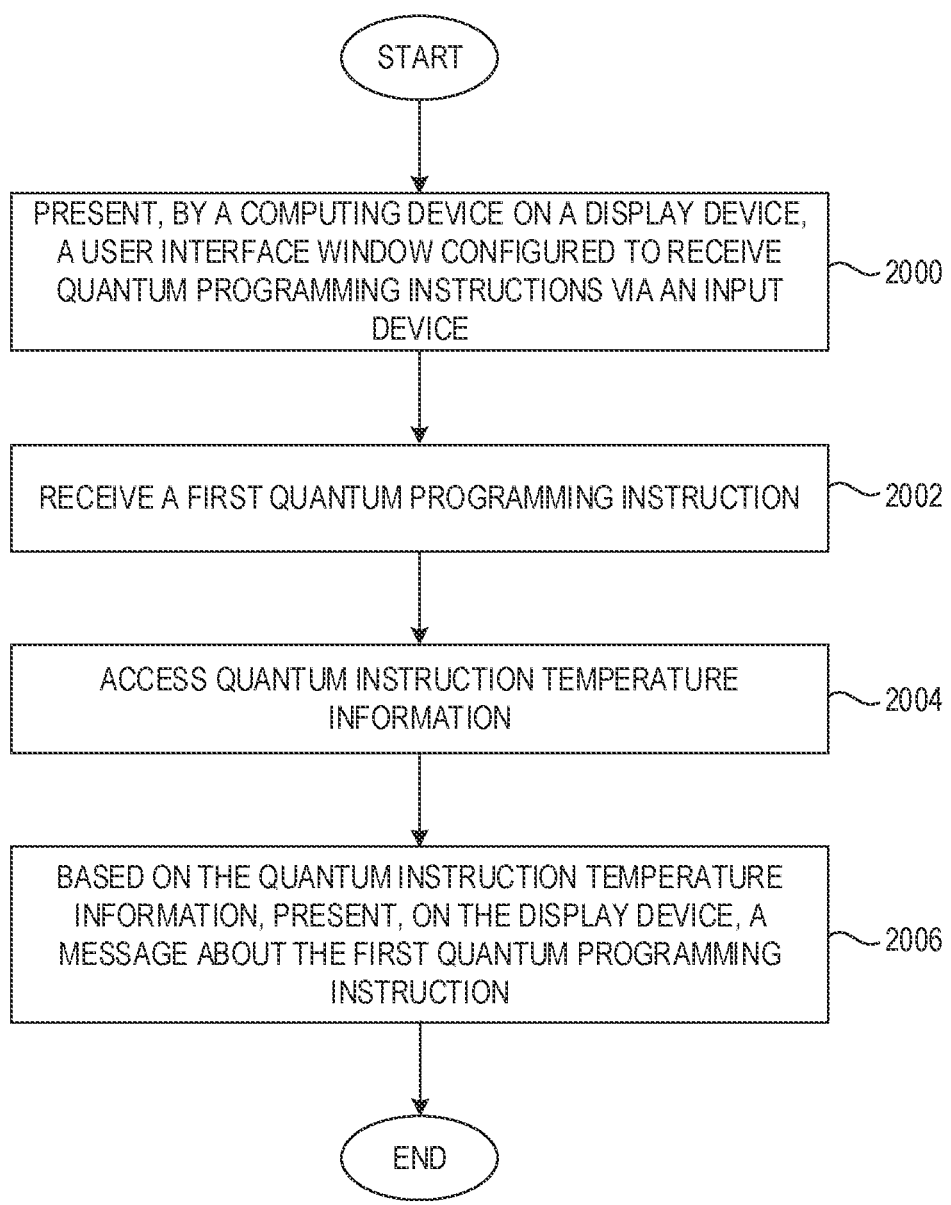
FIG. 5 is flowchart of a method for using quantum instruction temperature information in an integrated development environment according to one implementation.

FIG. 5 is a flowchart of a method for using quantum instruction temperature information in an integrated development environment according to one implementation. FIG. 5 will be discussed in conjunction with FIG. 4. The computing device 68 presents the user interface 80 that is configured to receive the quantum programming instruction 84 via an input device (FIG. 5, block 2000). The computing device 68 receives the quantum programming instruction 84 (FIG. 5, block 2002). The computing device 68 accesses the quantum instruction temperature information in the ITTR data structure 60 (FIG. 5, block 2004). Based on the quantum instruction temperature information, the computing device 68 presents, on the display device 82, the message 86 about the quantum programming instruction 84 (FIG. 5, block 2006).

Figure 6:
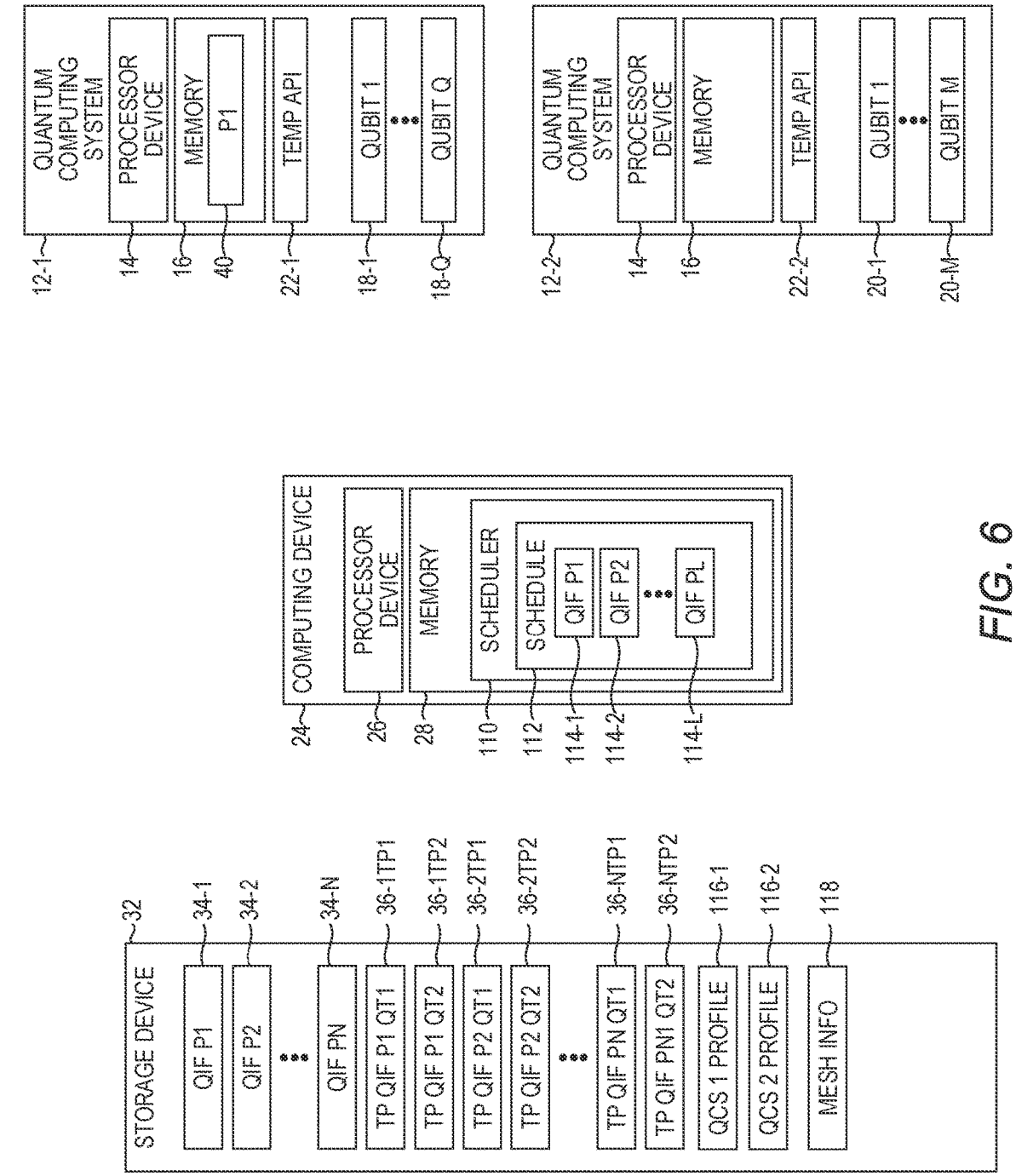
FIG. 6 is a block diagram of an environment in which quantum processes are initiated, based, at least in part, on temperature profiles that correspond to quantum instruction files, according to one implementation.

FIG. 6 is a block diagram of an environment 108 in which quantum processes are initiated based, at least in part, on temperature profiles that correspond to quantum instruction files. In this implementation, the quantum computing systems 12-1 and 12-2 are utilized for executing quantum processes from the quantum instruction files 34 subsequent to the generation of the temperature profiles 36. A scheduler 110 has a schedule 112 with a plurality of entries 114-1-114-L (generally, entries 114). Each entry 114 identifies a quantum instruction file 34 from which a quantum process is to be initiated on one of the quantum computing systems 12-1 and/or 12-2. The scheduler 110, prior to initiating quantum processes on the quantum computing systems 12 accesses the temperature profiles 36 that correspond to the quantum instruction files 34-1, 34-2-34-N. The scheduler 110 may also access quantum computing system profiles 116-1 and 116-2 to obtain information about the quantum computing systems 12-1 and 12-2, respectively. The quantum computing system profiles 116 may identify characteristics of the quantum computing systems 12, such as the number and type of qubits that the quantum computing systems 12 implement and suitable temperature ranges of the quantum computing systems 12 for executing quantum processes.

The scheduler 110 may initially, based on the temperature profiles 36, reorder the schedule 112 in an order of those quantum processes that cause the greatest increase in temperature to those quantum processes that cause the least increase in temperature. This may be desirable because it may be desirable to initially execute those quantum processes that cause the greatest heat impact at a time with the quantum computing systems 12 are at a lowest temperature.

The scheduler 110 may, based on the temperature profiles 36, identify sets of quantum processes to concurrently execute on a same quantum computing system 12. The sets of quantum processes may comprise, for example, a quantum process that has a greatest temperature impact and one or more quantum processes that have a lower temperature impact. This may allow the scheduler 110 to concurrently initiate multiple quantum processes on the same quantum computing system 12 without concern that the multiple quantum processes will cause the quantum computing system 12 to heat to an undesirable temperature, as might occur if multiple quantum processes that each cause a substantial increase in heat are initiated concurrently. Alternatively, some sets may comprise a plurality of quantum processes that have low temperature impacts, and other sets comprise individual quantum processes that have substantial heat impacts.

The scheduler 110 may determine, based on a current temperature of a quantum computing system 12, to initiate a particular quantum process on the quantum computing system 12. As an example, the scheduler 110 may access the temperature API 22-1 to determine a current temperature of the quantum computing system 12-1. The scheduler 110 also accesses the quantum computing system profile 116-1 to determine the ideal operating temperature range of the quantum computing system 12-1. The scheduler 110 determines that the quantum computing system 12-1 has a current temperature near an upper temperature range of the ideal operating temperature range. The scheduler 110, based on the temperature profiles 36, selects an entry 114 from the schedule 112 that identifies a quantum instruction file 34 that has a low temperature impact, and causes the initiation of a quantum process from such quantum instruction file 34 on the quantum computing system 12-1 to reduce the likelihood that the execution of a quantum process on the quantum computing system 12-1 will cause the quantum computing system 12-1 to heat beyond the ideal operating temperature range.

The scheduler 110 may determine, based on a hardware characteristic of a quantum computing system 12 to initiate a particular quantum process on such quantum computing system 12. For example, the quantum computing system 12-2 may implement a qubit type that rises in temperature more slowly, and/or rises a lesser amount, than a qubit type implemented by the quantum computing system 12-1. The scheduler 110, based on the temperature profiles 36, selects an entry 114 from the schedule 112 that identifies a quantum instruction file 34 that has a high temperature impact, and causes the initiation of a quantum process from such quantum instruction file 34 on the quantum computing system 12-2 rather than the quantum computing system 12-1.

In some implementations, a mesh information data structure 118 identifies a group of quantum instruction files 34 that collectively define a service mesh. The quantum instruction files 34 that implement the service mesh are to be initiated concurrently. The scheduler 110 may then access the temperature profiles 36 of the quantum instruction files 34 that implement the service mesh and cause the concurrent initiation of quantum processes from the quantum instruction files 34 on the quantum computing systems 12-1 and/or 12-2.

Figure 7:
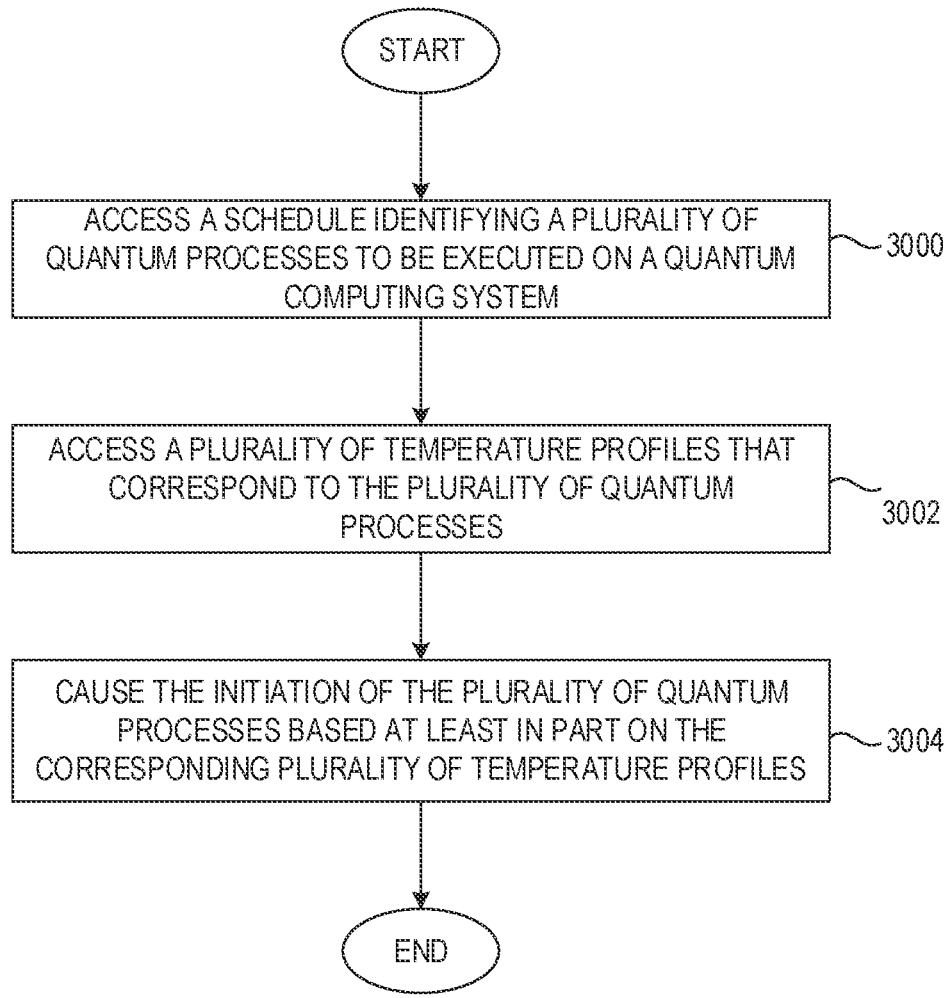
FIG. 7 is a flowchart of a method for scheduling quantum processes on a quantum computing system using temperature profiles, according to one implementation.

FIG. 7 is a flowchart of a method for scheduling quantum processes on a quantum computing system using temperature profiles, according to one implementation. FIG. 7 will be discussed in conjunction with FIG. 6. The scheduler 110 accesses the schedule 112 identifying a plurality of quantum processes to be executed on the quantum computing systems 12-1-12-2 (FIG. 7, block 3000). The scheduler 110 accesses the plurality of temperature profiles 36 that correspond to the plurality of quantum processes (FIG. 7, block 3002). The scheduler 110 causes the initiation of the plurality of quantum processes based at least in part on the corresponding plurality of temperature profiles 36 (FIG. 7, block 3004).

Figure 8:
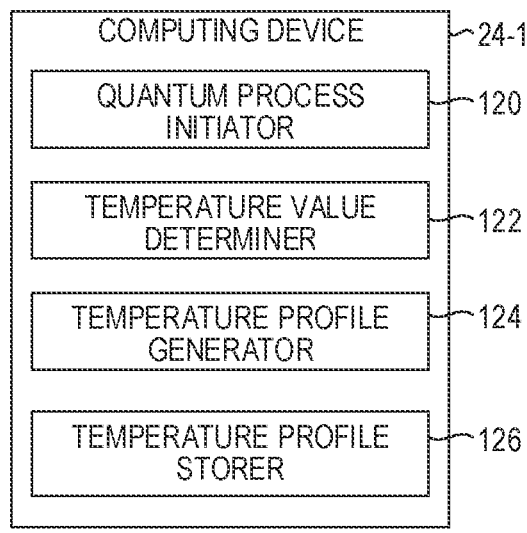
FIG. 8 is a block diagram of a computing device suitable for implementing aspects illustrated in FIG. 1, according to one implementation.

FIG. 8 is a block diagram of a computing device 24-1 according to another implementation. The computing device 24-1 implements identical functionality as that described above with regard to the computing device 24. The computing device 24-1 may be a classical computing device or a quantum computing system.

The computing device 24-1 includes a quantum process initiator 120 to cause the initiation of a first quantum process on a first quantum computing system. The quantum process initiator 120 may comprise executable software instructions configured to program a processor device to implement the functionality of causing the initiation of a first quantum process on a first quantum computing system, may comprise circuitry including, by way of non-limiting example, an application-specific integrated circuit (ASIC), field-programmable gate array (FPGA), or may comprise a combination of executable software instructions and circuitry.

The computing device 24-1 also includes a temperature value determiner 122 to determine, at a plurality of different times, a corresponding plurality of temperature values of the first quantum computing system associated with an execution of the first quantum process. The temperature value determiner 122 may comprise executable software instructions configured to program a processor device to implement the functionality of determining, at a plurality of different times, a corresponding plurality of temperature values of the first quantum computing system associated with an execution of the first quantum process, may comprise circuitry including, by way of non-limiting example, an ASIC, FPGA, or may comprise a combination of executable software instructions and circuitry.

The computing device 24-1 also includes a temperature profile generator 124 to, based on the plurality of temperature values, generate a first temperature profile that corresponds to the first quantum process. The temperature profile generator 124 may comprise executable software instructions to program a processor device to implement the functionality of, based on the plurality of temperature values, generating a first temperature profile that corresponds to the first quantum process, may comprise circuitry including, by way of non-limiting example, an ASIC, FPGA, or may comprise a combination of executable software instructions and circuitry.

The computing device 24-1 also includes a temperature profile storer 126 to store the first temperature profile. The temperature profile storer 126 may comprise executable software instructions to program a processor device to implement the functionality of storing the first temperature profile, may comprise circuitry including, by way of non-limiting example, an ASIC, FPGA, or may comprise a combination of executable software instructions and circuitry.

Figure 9:
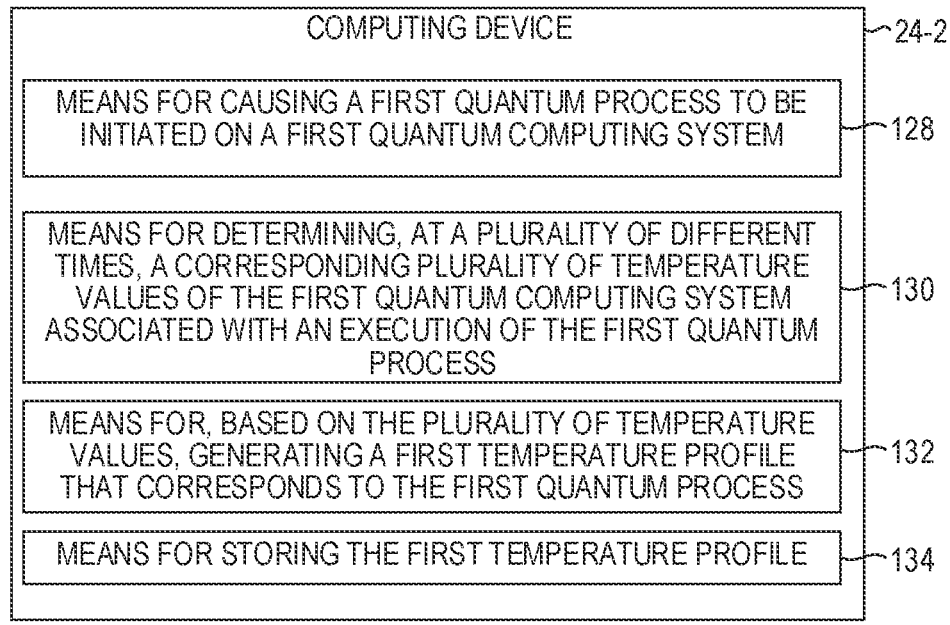
FIG. 9 is a block diagram of a computing device suitable for implementing aspects illustrated in FIG. 1, according to another implementation.

FIG. 9 is a block diagram of a computing device 24-2 according to additional implementations. The computing device 24-2 implements identical functionality as that described above with regard to the computing device 24. The computing device 24-2 may be a classical computing device or a quantum computing system.

In this implementation, the computing device 24-2 includes a means 128 for causing a first quantum process to be initiated on the first quantum computing system. The means 128 may be implemented in any number of manners, including, for example, via the quantum process initiator 120 illustrated in FIG. 8. The means 128 may, in some implementations, provide a quantum instruction file 34, or a URI to a quantum instruction file 34, to a quantum computing system 12 with instructions to initiate a quantum process from such quantum instruction file 34.

The computing device 24-2 also includes a means 130 for determining, at a plurality of different times, a corresponding plurality of temperature values of the first quantum computing system associated with an execution of the first quantum process. The means 130 may be implemented in any number of manners, including, for example, via the temperature value determiner 122 illustrated in FIG. 8. The means 130 may, in some implementations, repeatedly invoke a temperature API 22 of a corresponding quantum computing system 12 while the quantum process is executing to determine a plurality of temperature values of the quantum computing system.

The computing device 24-2 also includes a means 132 for, based on the plurality of temperature values, generating a first temperature profile that corresponds to the first quantum process. The means 132 may be implemented in any number of manners, including, for example, via the temperature profile generator 124 illustrated in FIG. 8.

The computing device 24-2 also includes a means 134 for storing the first temperature profile. The means 134 may be implemented in any number of manners, including, for example, via the temperature profile storer 126 illustrated in FIG. 8.

Figure 10:
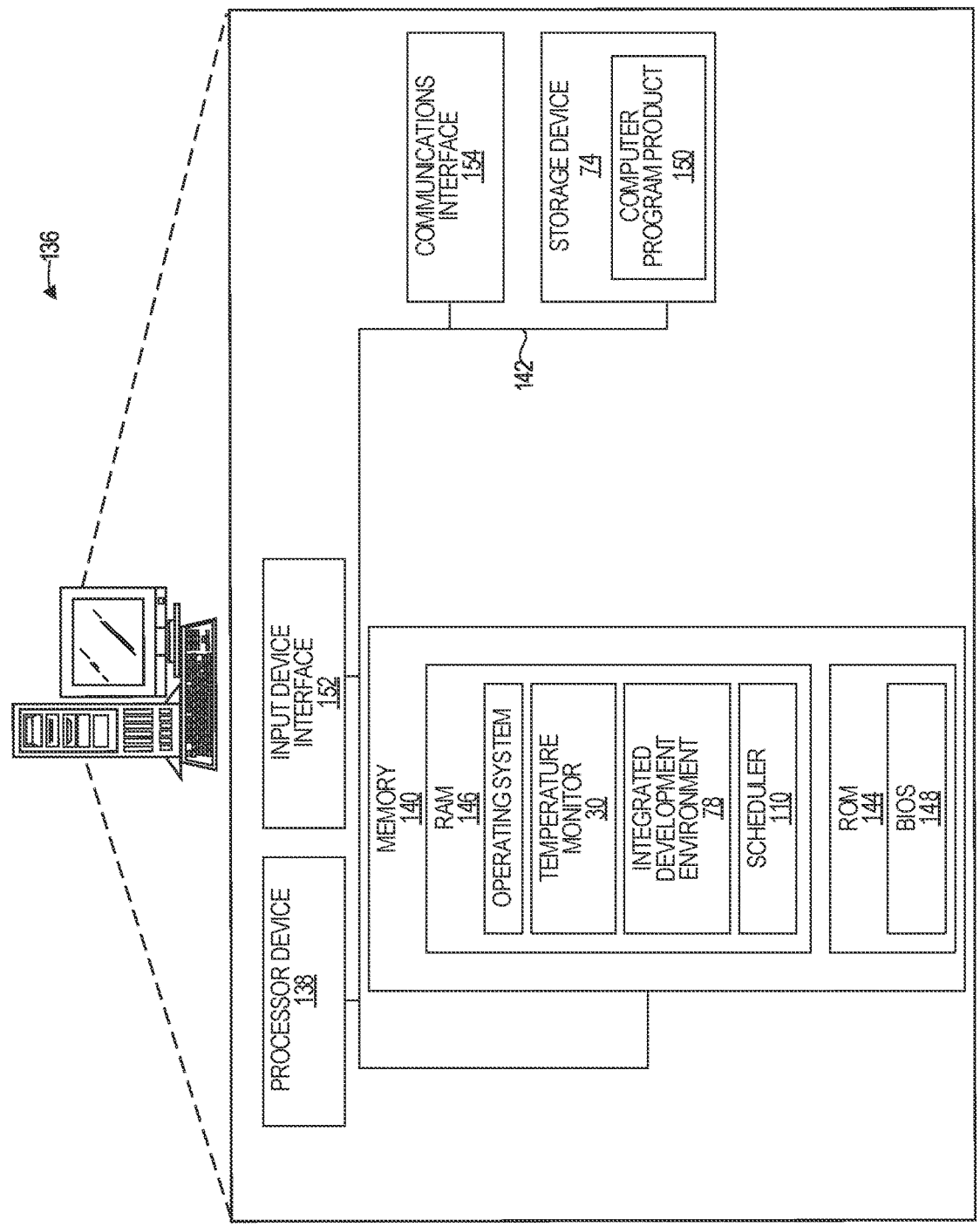
FIG. 10 is a block diagram of a computing device suitable for implementing examples disclosed herein.

FIG. 10 is a block diagram of a computing device 136 suitable for implementing examples disclosed herein. The computing device 136 may be a classical computing device or a quantum computing device. The computing device 136 comprises any computing or electronic device capable of including firmware, hardware, and/or executing software instructions to implement the functionality described herein, such as a computer server, a desktop computing device, a laptop computing device, a quantum computing system, or the like. The computing device 136 includes one or more processor devices 138, a memory 140, and a system bus 142. The system bus 142 provides an interface for system components including, but not limited to, the memory 140 and the one or more processor devices 138.

The system bus 142 may be any of several types of bus structures that may further interconnect to a memory bus (with or without a memory controller), a peripheral bus, and/or a local bus using any of a variety of commercially available bus architectures. The memory 140 may include non-volatile memory 144 (e.g., read-only memory (ROM), erasable programmable read-only memory (EPROM), electrically erasable programmable read-only memory (EEPROM), etc.), and volatile memory 146 (e.g., random-access memory (RAM)). A basic input/output system (BIOS) 148 may be stored in the non-volatile memory 144 and can include the basic routines that help to transfer information between elements within the computing device 136. The volatile memory 146 may also include a high-speed RAM, such as static RAM, for caching data.

The computing device 136 may further include or be coupled to a non-transitory computer-readable storage medium such as the storage device 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 74 and other drives associated with computer-readable media and computer-usable media may provide non-volatile storage of data, data structures, computer-executable instructions, and the like.

A number of modules can be stored in the storage device 74 and in the volatile memory 146, including an operating system and one or more program modules, such as the temperature monitor 30, the integrated development environment 78 and/or the scheduler 110, which may implement the functionality described herein in whole or in part. All or a portion of the examples may be implemented as a computer program product 150 stored on a transitory or non-transitory computer-usable or computer-readable storage medium, such as the storage device 74, which includes complex programming instructions, such as complex computer-readable program code, to cause the one or more processor devices 138 to carry out the steps described herein. Thus, the computer-readable program code can comprise software instructions for implementing the functionality of the examples described herein when executed on the one or more processor devices 138.

An operator may also be able to enter one or more configuration commands through a keyboard (not illustrated), a pointing device such as a mouse (not illustrated), or a touch-sensitive surface such as a display device. Such input devices may be connected to the one or more processor devices 138 through an input device interface 152 that is coupled to the system bus 142 but can be connected by other interfaces such as a parallel port, an Institute of Electrical and Electronic Engineers (IEEE) 1394 serial port, a Universal Serial Bus (USB) port, an IR interface, and the like.

The computing device 136 may also include a communications interface 154 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a computing device that includes: a quantum process initiator to cause the initiation of a first quantum process on a first quantum computing system; a temperature value determiner to determine, at a plurality of different times, a corresponding plurality of temperature values of the first quantum computing system associated with an execution of the first quantum process; a temperature profile generator to, based on the plurality of temperature values, generate a first temperature profile that corresponds to the first quantum process; and a temperature profile storer to store the first temperature profile.

Example 2 is a computing device that includes: means for causing a first quantum process to be initiated on the first quantum computing system; means for determining, at a plurality of different times, a corresponding plurality of temperature values of the first quantum computing system associated with an execution of the first quantum process; means for, based on the plurality of temperature values, generating a first temperature profile that corresponds to the first quantum process; and means for storing the first temperature profile.

Example 3 is a method that includes: presenting, by an interactive development environment (IDE) executing on a computing device, a user interface window configured to receive quantum programming instructions via an input device; receiving a first quantum programming instruction; accessing quantum instruction temperature information; and based on the quantum instruction temperature information, presenting, on the display device, a message about the first quantum programming instruction.

Example 4 is the method of example 3 wherein the message indicates that the first quantum programming instruction may cause an increase in temperature of a quantum computing system executing the first quantum programming instruction.

Example 5 is the method of example 3 wherein the first quantum programming instruction is one of a series of a plurality of quantum programming instructions, and wherein the message indicates that, due to a potential increase in heat of a quantum computing system, it may be desirable to move the first quantum programming instruction to a different location in the series of the plurality of quantum programming instructions.

Example 6 is the method of example 3 that further includes: accessing an alternative quantum instruction data structure; and presenting, on the display device, a message that indicates an alternative quantum programming instruction different from the first quantum programming instruction and a message indicating that the alternative quantum programming instruction may cause a lower rise in temperature than the first quantum programming instruction.

Example 7 is a computing device that includes a memory and a processor device coupled to the memory to present, by an interactive development environment (IDE) executing on the computing device, a user interface window configured to receive quantum programming instructions via an input device; receive a first quantum programming instruction; access quantum instruction temperature information; and based on the quantum instruction temperature information, present, on the display device, a message about the first quantum programming instruction.

Example 8 is the computing device of example 7, wherein the message indicates that the first quantum programming instruction may cause an increase in temperature of a quantum computing system executing the first quantum programming instruction.

Example 9 is a method that includes accessing, by a scheduler, a schedule identifying a plurality of quantum processes to be executed on a quantum computing system; accessing, by the scheduler, a plurality of temperature profiles that correspond to the plurality of quantum processes; and causing, by the scheduler, the initiation of the plurality of quantum processes based at least in part on the corresponding plurality of temperature profiles.

Example 10 is the method of example 9, wherein causing, by the scheduler, the initiation of the plurality of quantum process is based at least in part on the corresponding plurality of temperature profiles comprises causing the initiation of the plurality of quantum processes in an order of those quantum processes that causes a greatest increase in temperature to those quantum processes that cause a least increase in temperature.

Example 11 is the method of example 9 wherein causing, by the scheduler, the initiation of the plurality of quantum processes is based at least in part on the corresponding plurality of temperature profiles comprises causing the initiation of sets of the plurality of quantum processes based on the corresponding plurality of temperature profiles, wherein in the plurality of quantum processes in each set are initiated concurrently.

Example 12 is the method of example 9 that further includes accessing a plurality of hardware profiles that correspond to a plurality of quantum computing systems; and wherein causing, by the scheduler, the initiation of the plurality of quantum processes based at least in part on the corresponding plurality of temperature profiles further includes causing the initiation of at least one quantum process on a particular quantum computing system based on the temperature corresponding to the at least one quantum process and a hardware profile corresponding to the particular quantum computing system.

Example 13 is the method of example 9 that further includes obtaining, by the scheduler, a current temperature of the quantum computing system; and wherein causing, by the scheduler, the initiation of the plurality of quantum processes based at least in part on the corresponding plurality of temperature profiles includes causing the initiation of at least one quantum process based on a corresponding temperature profile and the current temperature of the quantum computing system.

Example 14 is a computing device that includes a memory and a processor device coupled to the memory to access, by a scheduler, a schedule identifying a plurality of quantum processes to be executed on a quantum computing system; access, by the scheduler, a plurality of temperature profiles that correspond to the plurality of quantum processes; and cause, by the scheduler, the initiation of the plurality of quantum processes based at least in part on the corresponding plurality of temperature profiles in an order of those quantum processes that causes a greatest increase in temperature to those quantum processes that cause a least increase in temperature.

Example 15 is the computing device of example 14, wherein to cause by the scheduler, the initiation of the plurality of quantum processes based at least in part on the corresponding plurality of temperature profiles, the processor device is further to cause the initiation of sets of the plurality of quantum processes based on the corresponding plurality of temperature profiles, wherein in the plurality of quantum processes in each set are initiated concurrently.

Example 16 is a method that includes: accessing, by a scheduler, service mesh information identifying a plurality of quantum processes that operate together to provide a service; accessing, by the scheduler, a plurality of temperature profiles that correspond to the plurality of quantum processes; and causing, by the scheduler, an initiation of the plurality of quantum processes on a plurality of different quantum computing systems based at least in part on the corresponding plurality of temperature profiles.

Example 17 is the method of example 16 that further includes accessing a plurality of hardware profiles that correspond to the plurality of quantum computing systems; and wherein causing, by the scheduler, the initiation of the plurality of quantum processes on the plurality of different quantum computing systems based at least in part on the corresponding plurality of temperature profiles further comprises causing, by the scheduler, the initiation of the plurality of quantum processes on the plurality of different quantum computing systems based at least in part on the corresponding plurality of temperature profiles and the plurality of hardware profiles.

Example 18 is a computing device that includes a memory and a processor device coupled to the memory to access, by a scheduler, service mesh information identifying a plurality of quantum processes that operate together to provide a service; access, by the scheduler, a plurality of temperature profiles that correspond to the plurality of quantum processes; and cause, by the scheduler, an initiation of the plurality of quantum processes on a plurality of different quantum computing systems based at least in part on the corresponding plurality of temperature profiles.

Individuals will recognize improvements and modifications to the preferred examples of the disclosure. All such improvements and modifications are considered within the scope of the concepts disclosed herein and the claims that follow.

What is claimed is:

1. A method comprising:
    causing, by a computing device, a first quantum process to be initiated on a first quantum computing system from a first quantum instruction file;
    determining, by the computing device, at a plurality of different times, a corresponding plurality of temperature values of the first quantum computing system associated with an execution of the first quantum process on the first quantum computing system;
    based on the plurality of temperature values of the first quantum computing system, generating a first temperature profile that corresponds to the first quantum instruction file;
    storing the first temperature profile;
    accessing, by a scheduler, a schedule identifying the first quantum instruction file;
    accessing, by the scheduler, a plurality of quantum computing system profiles that correspond to ones of a plurality of quantum computing systems, the plurality of quantum computing system profiles identifying a qubit type implemented by the corresponding plurality of quantum computing systems; and
    initiating, by the scheduler, a second quantum process from the first quantum instruction file on a quantum computing system of the plurality of quantum computing systems based on the first temperature profile and a qubit type implemented by the first quantum computing system.

2. The method of claim 1 wherein determining, by the computing device, at the plurality of different times, the corresponding plurality of temperature values of the first quantum computing system further comprises:
    determining a beginning temperature of the first quantum computing system;
    determining an intermediate temperature of the first quantum computing system; and
    determining a final temperature of the first quantum computing system.

3. The method of claim 1 wherein determining, at the plurality of different times, the corresponding plurality of temperature values of the first quantum computing system associated with the execution of the first quantum process further comprises:
    accessing the first quantum instruction file from which the first quantum process is initiated, the first quantum instruction file comprising a plurality of programming instructions; and
    iteratively, by the computing device:
        determining a first temperature of the first quantum computing system;
        submitting a programming instruction segment for execution on the first quantum computing system;
        determining a second temperature of the first quantum computing system subsequent to the execution of the programming instruction segment; and
        annotating the programming instruction segment in the quantum instruction file with temperature information based on the first temperature and the second temperature.

4. The method of claim 3 wherein each programming instruction segment comprises a single programming instruction.

5. The method of claim 3 wherein the programming instruction segments are delineated in the first quantum instruction file, and at least one programming instruction segment comprises a plurality of programming instructions.

6. The method of claim 3 further comprising:
generating, based on a plurality of quantum instruction files that have been annotated with the temperature information, a data structure that identifies the plurality of different programming instruction segments and, for each of the different programming instruction segments, corresponding temperature information;
determining, in an interactive development environment (IDE), that the programming instruction segment has been submitted to the IDE;
accessing the data structure to determine that the programming instruction segment is one of the plurality of different programming instruction segments; and
providing, on a display device, information based on the temperature information that corresponds to the programming instruction segment.

7. The method of claim 6 wherein the information is a warning that the programming instruction segment is a programming instruction segment that results in a heat increase above a determined threshold.

8. The method of claim 6 wherein the information is a suggestion that the programming instruction segment be moved to a different location in a series of programming instruction segments submitted to the IDE such that the programming instruction segment is executed by a quantum computing system in a different order with respect to the other programming instruction segments.

9. The method of claim 6 wherein generating the data structure that identifies the plurality of different programming instruction segments and, for each of the different programming instruction segments, the corresponding temperature information comprises training a machine-learned model (MLM) with the different programming instruction segments and the corresponding temperature information.

10. The method of claim 1 further comprising:
generating a plurality of temperature profiles that correspond to a plurality of quantum instruction files, by iteratively, for each respective quantum instruction file of the plurality of quantum instruction files:
determining, by the computing device, a beginning temperature associated with the first quantum computing system;
causing, by the computing device, a quantum process to be initiated on the first quantum computing system from the respective quantum instruction file;
determining, while the quantum process is executing on the first quantum computing system, an intermediate temperature of the first quantum computing system;
determining a final temperature of the first quantum computing system; and
storing, based on the beginning temperature, the intermediate temperature, and the final temperature, a respective temperature profile that corresponds to the respective quantum instruction file.

11. The method of claim 1 wherein the first quantum computing system implements qubits that are a first qubit type, and further comprising:
causing, by the computing device, a second quantum process to be initiated on a second quantum computing system from the first quantum instruction file, the second quantum computing system implementing qubits that are a second qubit type;
determining, by the computing device, at a plurality of different times, a corresponding plurality of temperature values of the second quantum computing system associated with an execution of the second quantum process on the second quantum computing system;
based on the plurality of temperature values of the second quantum computing system, generating a second temperature profile that corresponds to the first quantum instruction file; and
storing the second temperature profile.

12. The method of claim 11 wherein the first qubit type comprises an electron qubit type and the second qubit type comprises a photon qubit type.

13. The method of claim 1 wherein the computing device comprises the first quantum computing system.

14. The method of claim 1 wherein determining the plurality of temperature values of the first quantum computing system comprises invoking a quantum system application programming interface that, when invoked, returns a current temperature of the first quantum computing system.

15. The method of claim 1 wherein determining the plurality of temperature values of the first quantum computing system comprises determining a plurality of intermediate temperatures over a period of time while the first quantum process is executing on the first quantum computing system; and
wherein the first temperature profile is at least partially based on the plurality of intermediate temperatures.

16. The method of claim 1 wherein determining one of the plurality of temperature values comprises:
determining that the first quantum process has terminated;
waiting, by the computing device, a determined period of time; and
after the determined period of time has elapsed, determining a final temperature of the first quantum computing system.

17. A computing device, comprising:
a memory; and
a processor device coupled to the memory to:
cause a first quantum process to be initiated on a quantum computing system;
determine, at a plurality of different times, a corresponding plurality of temperature values of the quantum computing system while the first quantum process is executing on the quantum computing system;
based on the plurality of temperature values of the quantum computing system, generate a temperature profile that corresponds to a quantum instruction file from which the first quantum process is initiated;
store the temperature profile;
access, by a scheduler, a schedule identifying the first quantum instruction file;
access, by the scheduler, a plurality of quantum computing system profiles that correspond to ones of a plurality of quantum computing systems, the plurality of quantum computing system profiles identifying a qubit type implemented by the corresponding plurality of quantum computing systems; and
initiate, by the scheduler, a second quantum process from the first quantum instruction file on a quantum computing system of the plurality of quantum computing systems based on the first temperature profile and a qubit type implemented by the quantum computing system.

18. The computing device of claim 17 wherein to determine, at the plurality of different times, the corresponding plurality of temperature values of the quantum computing system, the processor device is further to:
   determine a beginning temperature of the quantum computing system;
   determine an intermediate temperature of the quantum computing system; and
   determine a final temperature of the quantum computing system.

19. A non-transitory computer-readable storage medium that includes executable instructions configured to cause a processor device to:
   cause a first quantum process to be initiated on a quantum computing system from a quantum instruction file;
   determine a corresponding plurality of temperature values of the quantum computing system while the first quantum process is executing on the quantum computing system;
   based on the plurality of temperature values, generate a temperature profile that corresponds to the quantum instruction file;
   store the temperature profile;
   access, by a scheduler, a schedule identifying the first quantum instruction file;
   access, by the scheduler, a plurality of quantum computing system profiles that correspond to ones of a plurality of quantum computing systems, the plurality of quantum computing system profiles identifying a qubit type implemented by the corresponding plurality of quantum computing systems; and
   initiate, by the scheduler, a second quantum process from the first quantum instruction file on a quantum computing system of the plurality of quantum computing systems based on the first temperature profile and a qubit type implemented by the quantum computing system.

20. The non-transitory computer-readable storage medium of claim 19 wherein to determine, at the plurality of different times, the corresponding plurality of temperature values of the quantum computing system, the instructions further cause the processor device to:
   determine a beginning temperature of the quantum computing system;
   determine an intermediate temperature of the quantum computing system; and
   determine a final temperature of the quantum computing system.

* * * * *